US012563107B2

(12) United States Patent
Sodagar

(10) Patent No.:  US 12,563,107 B2
(45) Date of Patent:  Feb. 24, 2026

(54) METHOD FOR NETWORK-SIDE AND CLIENT SIDE ACTIVATION OF THE EDGE SERVERS IN 5G MEDIA STREAMING ARCHITECTURE

(71) Applicant: TENCENT AMERICA LLC, Palo Alto, CA (US)

(72) Inventor: Iraj Sodagar, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 366 days.

(21) Appl. No.: 18/120,878

(22) Filed: Mar. 13, 2023

(65) Prior Publication Data

US 2023/0319118 A1      Oct. 5, 2023

Related U.S. Application Data

(60) Provisional application No. 63/325,518, filed on Mar. 30, 2022.

(51) Int. Cl.
H04L 65/1023      (2022.01)
H04L 65/612      (2022.01)
H04L 67/1008      (2022.01)

(52) U.S. Cl.
CPC ........ H04L 65/1026 (2013.01); H04L 65/612 (2022.05); H04L 67/1008 (2013.01)

(58) Field of Classification Search
CPC ............... H04L 65/1026; H04L 65/612; H04L 67/1008; H04L 65/1063; H04L 65/1066; H04L 65/65
See application file for complete search history.

(56) References Cited

U.S. PATENT DOCUMENTS

| | | | |
|---|---|---|---|
| 2021/0105338 A1 | 4/2021 | Oyman et al. | |
| 2021/0314379 A1 | 10/2021 | Sodagar | |
| 2021/0320810 A1 | 10/2021 | Kolan et al. | |
| 2021/0320955 A1 * | 10/2021 | Kolan ..................... | H04L 65/60 |

(Continued)

FOREIGN PATENT DOCUMENTS

| | | | | |
|---|---|---|---|---|
| WO | WO-2022034281 A1 * | 2/2022 | ............. | H04L 43/08 |

OTHER PUBLICATIONS

3GPP TS 26.512 V16.5.0 (Mar. 2022).*

(Continued)

*Primary Examiner* — Charles C Jiang
(74) *Attorney, Agent, or Firm* — Morgan, Lewis & Bockius LLP

(57) ABSTRACT

The present application provides a computer-implemented method for provisioning edge resources performed by a computing device in the 5G media streaming architecture. The computing device receives a new edge resources configuration request from a first device in connection with a 5G media streaming session. The computing device determines an edge management mode of the new edge resources configuration request. The computing device allocates edge resources for the 5G media streaming session based on the edge management mode, which may be driven by the application provider on the network side or by the media session handler on the client side. The computing device then returns a response to the first device, the response including information of the edge resources allocated for the new edge resources configuration request.

15 Claims, 7 Drawing Sheets

Table 2: Definition of EdgeResourcesConfiguration dataset

| Property name | Type | Cardinality | Description |
|---|---|---|---|
| edgeResourcesConfigurationId | ResourceId | 1..1 | An identifier for this Edge Resources Configuration that is unique within the scope of the enclosing Provisioning Session. |
| edgeManagementMode | EdgeManagementMode | 1..1 | Indicates whether the management of edge resources is application-driven or network-driven. |
| eligibilityCriteria | EdgeProcessing EligibilityCriteria | 0..1 | Condition to activate edge resources for this Provisioning Session. If the activationTrigger element is not provided by Application Provider, it shall be assumed that all media sessions related to the same Provisioning Session will use edge resources. |
| easRequirements | EASRequirements | 1..1 | Requirements on the EAS Profile used by the 5GMS AF or by the EEC to discover and select one or more 5GMS EAS instances to serve media streaming sessions. |
| easRelocationRequirements | array(MEAS Relocation Requirements) | 0..1 | EAS relocation tolerance and requirements. If not present, the 5GMS AF shall assume that the application client is unaware of context transfer and that transfers to a target 5GMS EAS are allowed |

(56) References Cited

U.S. PATENT DOCUMENTS

| | | | |
|---|---|---|---|
| 2021/0352113 A1 | 11/2021 | Sodagar | |
| 2023/0052505 A1* | 2/2023 | Stockhammer | ....... H04L 67/147 |

OTHER PUBLICATIONS

ETSI TS 126 512 V16.1.0 (Jan. 2021).*
3GPP TS26.501 v. 17.0.1, (Jan. 2022). This is provided in the IDS.*
Technical Specification, "3rd Generation Partnership Project; Technical Specification Group Services and System Aspects; 5G Media Streaming (5GMS); General description and architecture (Release 17)", 3GPP TS 26.501V17.0.1 (Jan. 2022), 87 pgs.
Technical Specification, "3rd Generation Partnership Project; Technical Specification Group Services and System Aspects; Architecture for enabling Edge Applications; (Release 17)", 3GPP TS 23.558 V17.3.0 (Mar. 2022), 166 pgs.
Tencent Technology, ISRWO, PCT/US2023/015191, Jun. 15, 2023, 9 pgs.
Tencent America LLC, Extended European Search Report, EP Patent Application No. EP 23776805.6, May 27, 2025.
Qualcomm Incorporated, "CR on Edge Provisioning for Media Services", 3GPP TSG-SA4 Meeting #117-e, Feb. 14-22, 2022, 3GPP Draft, Document No. S4-220292, vol. SA. Wg4, No. Feb. 14, 2022-Feb. 22, 2022, Feb. 2022, Retrieved from the Internet: https://www.3gpp.org/ftp/tsg_sa/WG4_CODEC/.

* cited by examiner

Table 1: Operations supported by the Edge Resources API

| Operation | Sub-resource path | Allowed HTTP method(s) | Description |
|---|---|---|---|
| Configure Edge Resources | edge-resources-configurations | POST | Invoked on the Edge Resources Configurations collection to create a new Edge Resources Configuration.<br><br>If the operation succeeds, the URL of the newly created Edge Resources Configuration resource shall be returned in the Location header of the response. |
| Retrieve Edge Resources Configuration | edge-resources-configurations/ *{edgeResourcesConfigurationId}* | GET | Used to retrieve a specific Edge Resources Configuration resource. |
| Modify Edge Resources Configuration | | PUT, PATCH | Used to modify or replace an existing Edge Resources Configuration resource. |
| Destroy Edge Resources Configuration | | DELETE | Used to destroy an existing Edge Resources Configuration resource. |

FIG. 5

Table 2: Definition of EdgeResourcesConfiguration dataset

| Property name | Type | Cardinality | Description |
|---|---|---|---|
| edgeResourcesConfigurationId | ResourceId | 1..1 | An identifier for this Edge Resources Configuration that is unique within the scope of the enclosing Provisioning Session. |
| edgeManagementMode | EdgeManagementMode | 1..1 | Indicates whether the management of edge resources is application-driven or network-driven. |
| eligibilityCriteria | EdgeProcessing EligibilityCriteria | 0..1 | Condition to activate edge resources for this Provisioning Session. If the activationTrigger element is not provided by Application Provider, it shall be assumed that all media sessions related to the same Provisioning Session will use edge resources. |
| easRequirements | EASRequirements | 1..1 | Requirements on the EAS Profile used by the 5GMS AF or by the EEC to discover and select one or more 5GMS EAS instances to serve media streaming sessions. |
| easRelocationRequirements | array(M1EAS Relocation Requirements) | 0..1 | EAS relocation tolerance and requirements. If not present, the 5GMS AF shall assume that the application client is unaware of context transfer and that transfers to a target 5GMS EAS are allowed. |

FIG. 6

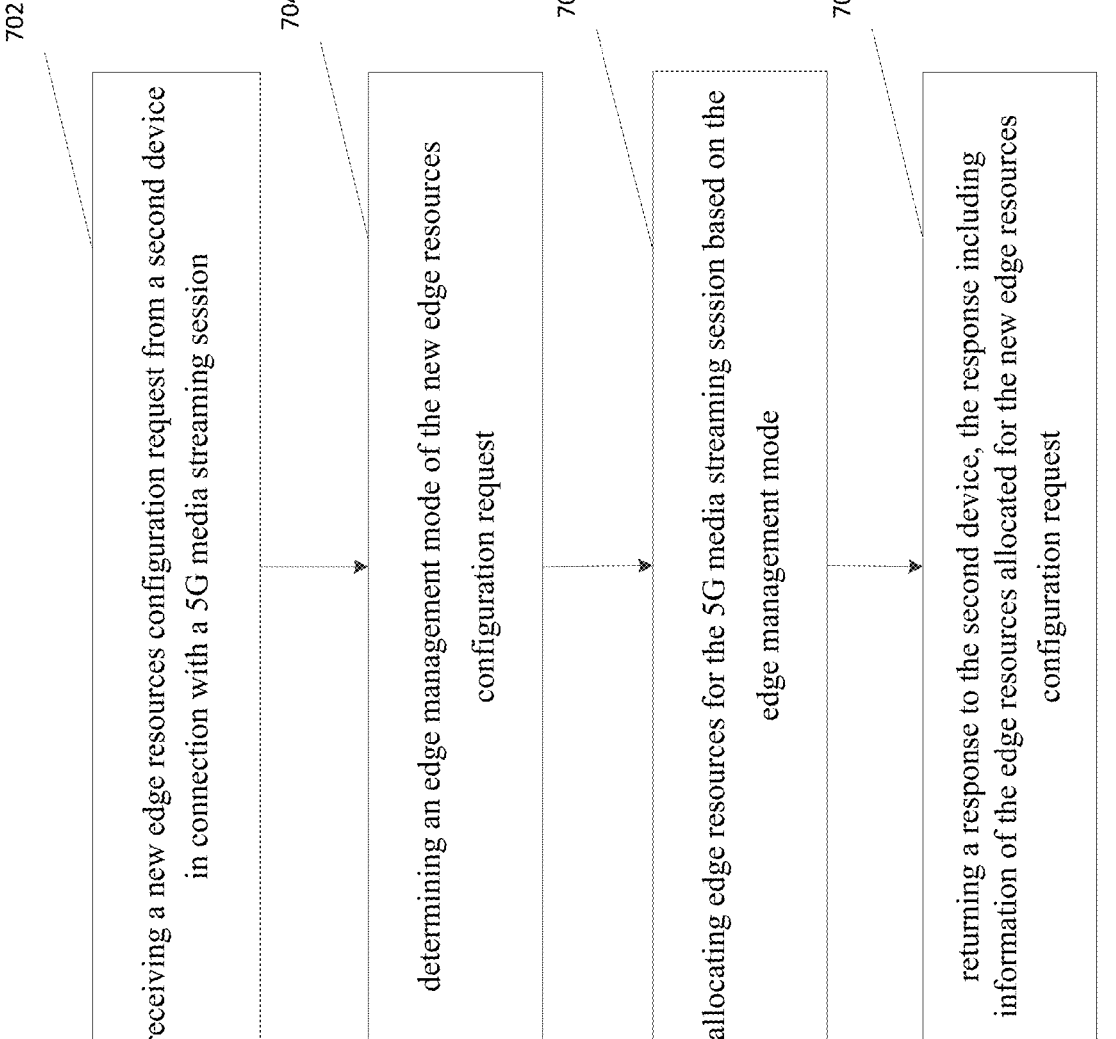

702 — receiving a new edge resources configuration request from a second device in connection with a 5G media streaming session 704 — determining an edge management mode of the new edge resources configuration request 706 — allocating edge resources for the 5G media streaming session based on the edge management mode 708 — returning a response to the second device, the response including information of the edge resources allocated for the new edge resources configuration request

METHOD FOR NETWORK-SIDE AND CLIENT SIDE ACTIVATION OF THE EDGE SERVERS IN 5G MEDIA STREAMING ARCHITECTURE

CROSS-REFERENCE TO RELATED APPLICATION

This application claims priority from U.S. Provisional Application No. 63/325,518, entitled "METHOD FOR NETWORK-SIDE AND CLIENT-SIDE ACTIVATION OF THE EDGE SERVERS IN 5G MEDIA STREAMING ARCHITECTURE" filed Mar. 30, 2022, the disclosure of which is incorporated herein by reference in its entirety.

TECHNICAL FIELD

The disclosed implementations relate generally to 5G media streaming (5GMS) architecture, and in particular, to methods for activating edge servers in 5G media streaming architecture using the 5GMS M1 provisioning interface.

BACKGROUND

The current 5G Edge architecture defined in 3GPP TS23.558 only defines the discovery of the edge application by Application clients. The 5G media streaming architecture defined in 3GPP TS26.501 recently added the use of TS23.558 edge architecture as part of the 5GMS architecture as an extension. However, the actual method of provisioning such services currently is not defined.

SUMMARY

In accordance with some implementations of the present application, a computer-implemented method for provisioning edge resources is performed by a computing device in a 5G media streaming (5GMS) architecture. The method includes receiving a new edge resources configuration request from a first device in connection with a 5G media streaming session; determining an edge management mode of the new edge resources configuration request; allocating edge resources for the 5G media streaming session based on the edge management mode; and returning a response to the first device, the response including information of the edge resources allocated for the new edge resources configuration request.

In accordance with some implementations of the present application, a computing device includes one or more processors; memory; and one or programs stored in the memory for performing the aforementioned computer-implemented method for provisioning edge resources.

In accordance with some implementations of the present application, a non-transitory computer readable storage medium stores one or more programs configured for execution by a computing device that includes one or more processors and memory storing one or more programs to perform the aforementioned computer-implemented method for provisioning edge resources.

BRIEF DESCRIPTION OF DRAWINGS

The aforementioned implementation of the invention as well as additional implementations will be more clearly understood as a result of the following detailed description of the various aspects of the invention when taken in conjunction with the drawings. Like reference numerals refer to corresponding parts throughout the several views of the drawings.

FIG. 5 is a table of operations supported by the edge resources API, according to embodiments.

FIG. 6 is a table of definitions of the edge resources configuration properties, according to embodiments.

FIG. 7 is a flowchart of a method for provisioning edge resources, according to embodiments.

DETAILED DESCRIPTION

Figure 1:
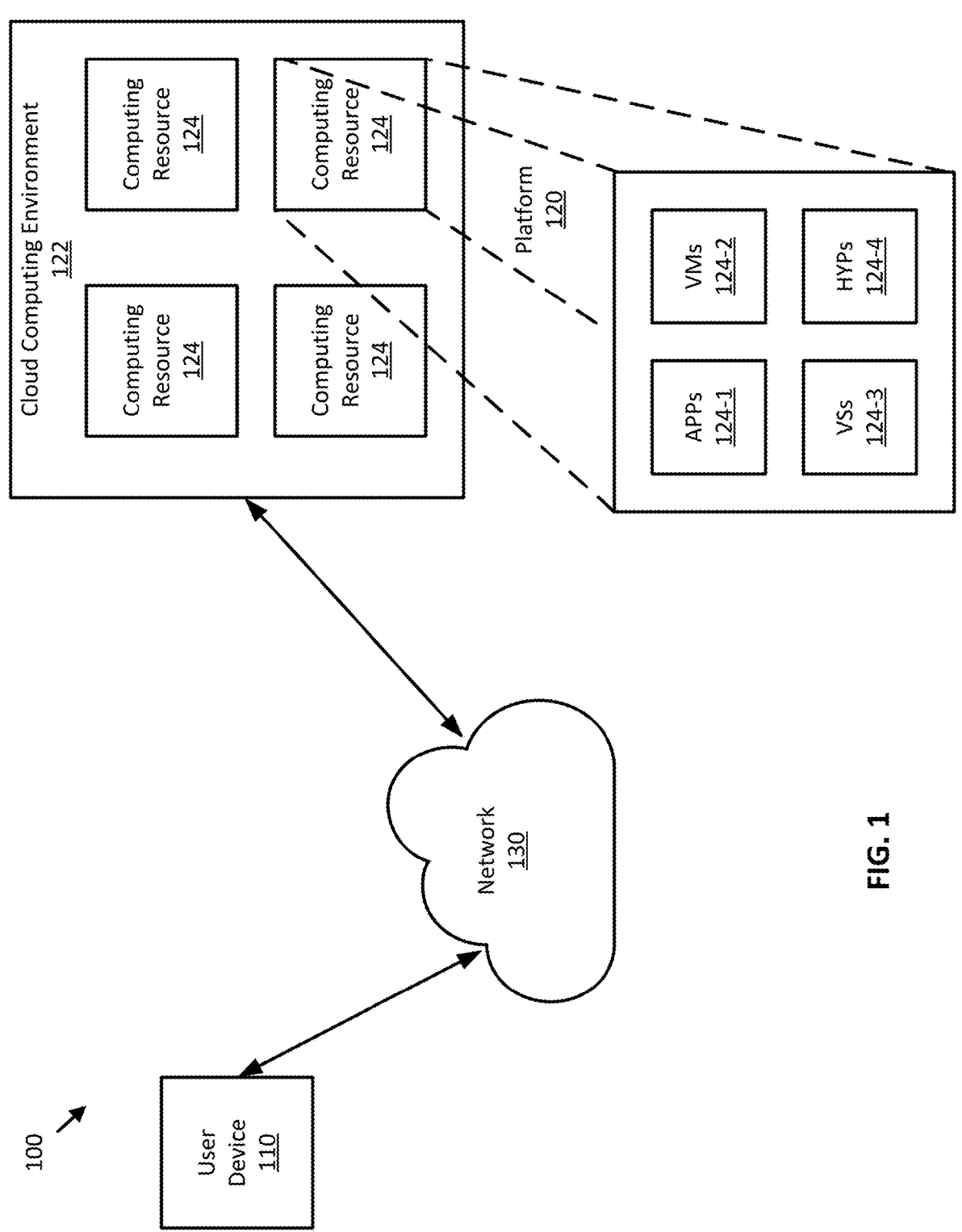
FIG. 1 is a block diagram of an environment in which methods, apparatuses, and systems described herein may be implemented, according to embodiments.

FIG. 1 is a block diagram of an environment 100 in which methods, apparatuses, and systems described herein may be implemented, according to embodiments. As shown in FIG. 1, the environment 100 includes a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. The user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, servers, or other types of computation and/or communication devices required for hosting the platform 120. The cloud resources 124 may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications (APPs) 124-1, one or more virtual machines (VMs) 124-2, virtualized storage (VSs) 124-3, one or more hypervisors (HYPs) 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g., a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system (OS). A process virtual machine may execute a single program, and may support a single process. In some implementations, the virtual machine 124-2 may execute on behalf of a user (e.g., the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to the specific physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g. a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g. the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In some implementations, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Figure 2:
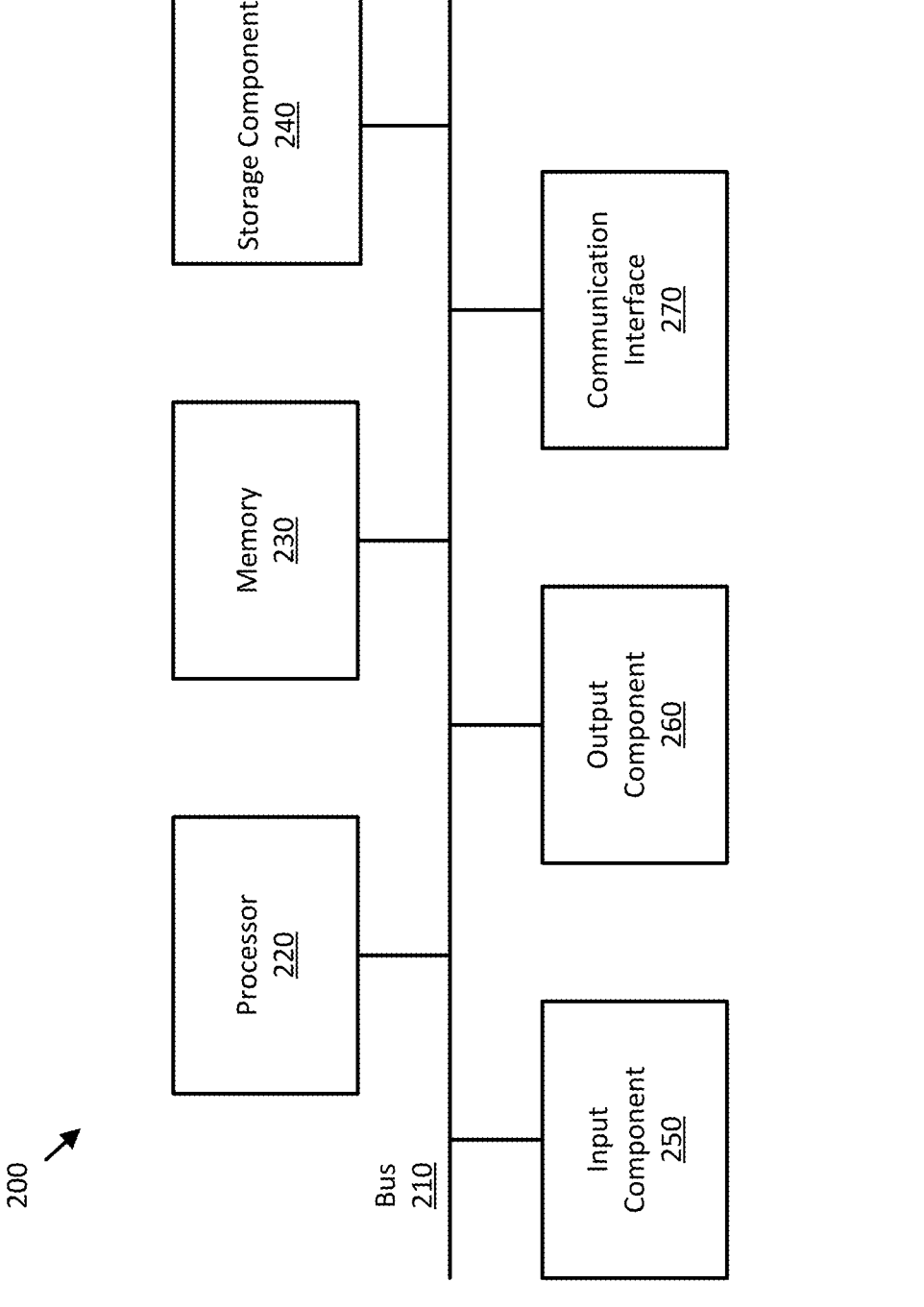
FIG. 2 is a block diagram of example components of one or more devices of FIG. 1.

FIG. 2 is a block diagram of example components of one or more devices of FIG. 1. The device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g. a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable storage medium is defined herein as a non-transitory computer-readable storage device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In some implementations, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

A 5G media streaming (5GMS) system may be an assembly of application functions, application servers, and interfaces from the 5G media streaming architecture that support either downlink media streaming services or uplink media streaming services, or both. A 5GMS Application Provider (e.g., a streaming service providing website) may include a party that interacts with functions of the 5GMS system and supports a 5GMS Aware Application that interacts with functions of the 5GMS system. The 5GMS Aware Application (e.g., an application running on a mobile phone) may refer to an application in the user equipment (UE), provided by the 5GMS Application Provider, that contains the service logic of the 5GMS application service, and interacts with other 5GMS Client and Network functions via the interfaces and application programming interfaces (APIs) defined in the 5GMS architecture. A 5GMS Client may refer to a UE function that is either a 5GMS downlink (5GMSd) Client or a 5GMS uplink (5GMSu) Client, or both.

The 5GMSd Client may refer to a UE function that includes at least a 5G media streaming player and a media session handler for downlink streaming and that may be accessed through well-defined interfaces/APIs. The 5GMSu Client may refer to an originator of a 5GMSu service that may be accessed through well-defined interfaces/APIs. A 5GMSu media streamer may refer to a UE function that enables uplink delivery of streaming media content to an Application Server (AS) function of the 5GMS Application Provider, and which interacts with both the 5GMSu Aware Application for media capture and subsequent streaming, and the Media Session Handler for media session control.

A dynamic policy may refer to a dynamic policy and charging control (PCC) rule for an uplink or downlink application flow during a media session. An egest session may refer to an uplink media streaming session from the 5GMS AS towards the 5GMSu Application Provider. An ingest session may refer to a session to upload the media content to a 5GMSd AS. A policy template may refer to a collection of (semi-static) Policy or Control Function (PCF)/ Network Exposure Function (NEF) API parameters which are specific to the 5GMS Application Provider and also the resulting PCC rule. A policy template ID may identify the desired policy template, which is used by the 5GMSd Application Function (AF) to select the appropriate PCF/ NEF API towards the 5G system so that the PCF can compile the desired PCC rule. The Media Player Entry may refer to a document or a pointer to a document that defines a media presentation (e.g., a media presentation description (MPD) for DASH or a uniform resource locator (URL) to a video clip file). A Media Streamer Entry may refer to a pointer (e.g., in the form of a URL) that defines an entry point of an uplink media streaming session. A presentation entry may refer to a document or a pointer to a document that defines an application presentation, such as an HTML5 document.

A Provisioning Session may refer to a data structure supplied at an interface (Mid) by a 5GMSd Application provider that configures the 5GMSd features relevant to a set of 5GMSd Aware Applications. A 5GMSd Media Player may refer to a UE function that enables playback and rendering of a media presentation based on a media play entry and exposing some basic controls such as play, pause, seek, stop, to the 5GMSd Aware Application. Server Access Information may refer to a set of parameters and addresses (including 5GMSd AF and 5GMSd AS addresses) which are needed to activate the reception of a streaming session. A Service and Content Discovery may refer to functionality and procedures provided by a 5GMSd Application Provider to a 5GMS Aware Application that enables the end user to discover the available streaming service and content offerings and select a specific service or content item for access. A Service Announcement may refer to procedures conducted between the 5GMS Aware Application and the 5GMS Application Provider such that the 5GMS Aware Application is able to obtain 5GMS Service Access Information, either directly or in the form of a reference to that information.

A third-party player may refer to a part of an application that uses APIs to exercise selected 5GMSd functions to play back media content. A third-party uplink streamer may refer to a part of an application that uses APIs to exercise selected 5GMSu functions to capture and stream media content.

Figure 3:
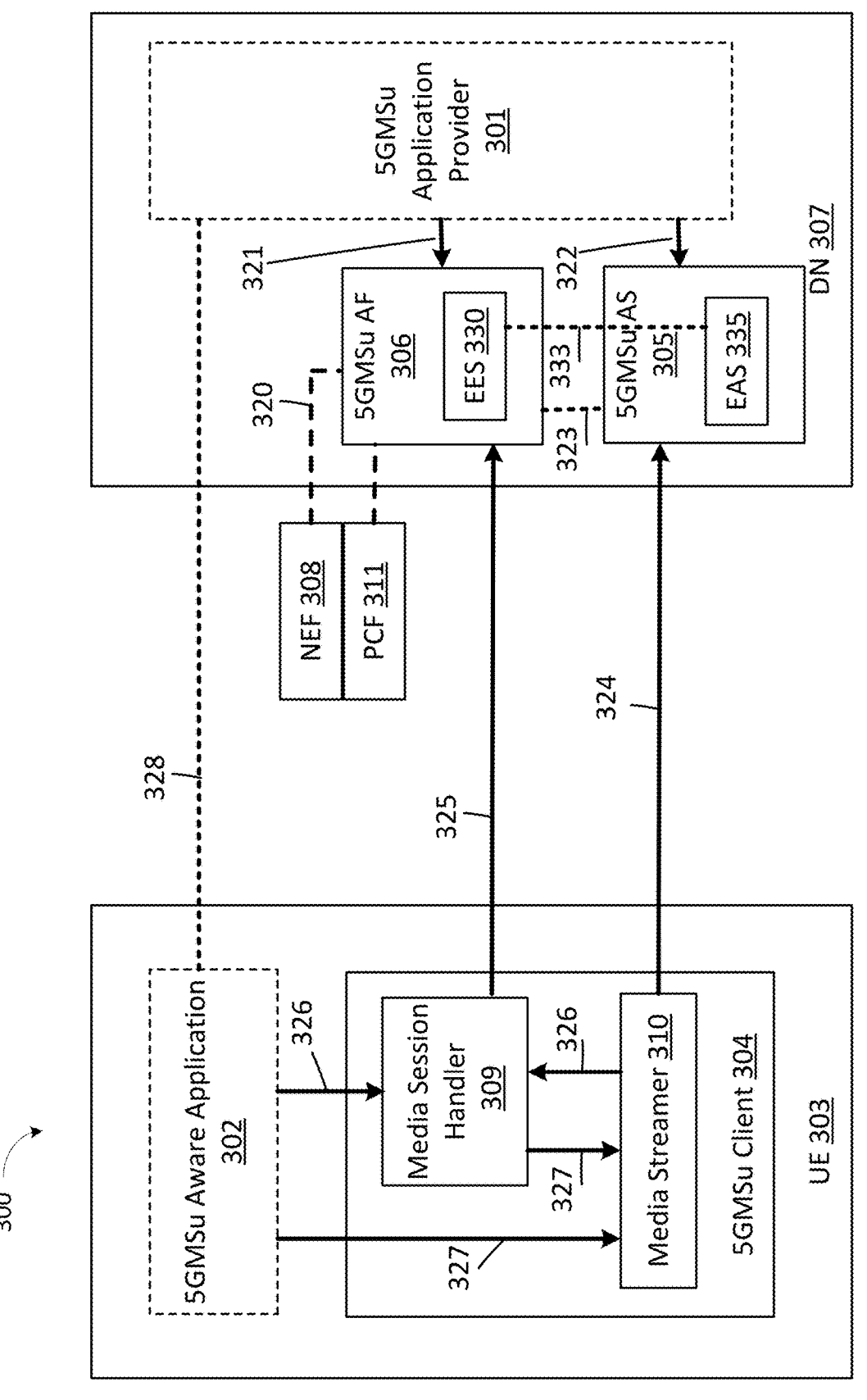
FIG. 3 is a block diagram of a 5G media streaming architecture with edge computing extension for media uplink streaming, according to embodiments.

FIG. 3 is a block diagram of a 5G media streaming architecture 300 with edge computing extension for media uplink streaming according to embodiments. A 5GMSu Application Provider 301 may use 5GMSu for uplink streaming services. 5GMSu Application provider 301 may provide a 5GMSu Aware Application 302 on the UE 303 to make use of 5GMSu Client 304 and network functions using interfaces and APIs defined in 5GMSu. 5GMSu AS may be an AS dedicated to 5G Media Uplink Streaming. 5GMSu Client 304 may be a UE 303 internal function dedicated to 5G Media Uplink Streaming.

5GMSu AF 306 and 5GMSu AS 305 may be Data Network (DN) 307 functions. Functions in trusted DNs may be trusted by the operator's network. Therefore, AFs in trusted DNs may directly communicate with all 5G Core functions. Functions in external DNs may only communicate with 5G Core functions via the NEF 308 using link 320.

The media architecture 300 may connect UE 303 internal functions and related network functions for 5G Media Uplink Streaming. Accordingly, media architecture 300 may include a number of functions. For example, 5GMSu Client 304 on UE 303 may be an originator of 5GMSu service that may be accessed through interfaces/APIs. 5GMSu Client 304 may include two sub-functions, media session handler 309 and media streamer 310. Media session handler 309 may communicate with the 5GMSu AF 306 in order to establish, control and support the delivery of a media session. The Media Session Handler 309 may expose APIs that can be used by the 5GMSu Aware Application 302. Media Streamer 310 may communicate with 5GMSu AS 305 in order to stream the media content and provide a service to the 5GMSu Aware Application 302 for media capturing and streaming, and the Media Session Handler 309 for media session control. 5GMSu Aware Application 302 may control 5GMSu Client 304 by implementing external application or content service provider specific logic and enabling the establishment of a media session. 5GMSu AS 305 may host 5G media functions and may be implemented as a content delivery network (CDN), for example. 5GMSu Application Provider 301 may be an external application or content specific media functionality, e.g., media storage, consumption, transcoding and redistribution that uses 5GMSu to stream media from 5GMSu Aware Application 302. 5GMSu AF 306 may provide various control functions to the Media Session Handler 309 on the UE 303 and/or to 5GMSu Application Provider 301. 5GMSu AF 306 may relay or initiate a request for different PCF 311 treatment or interact with other network functions.

Media architecture 300 may include a number of different interfaces. For example, link 321 may relate to M1u, which may be a 5GMSu Provisioning API exposed by 5GMSu AF 306 to provision usage of media architecture 300 and to obtain feedback. Link 322 may relate to M2u, which may be a 5GMSu Publish API exposed by 5GMSu AS 305 and used when 5GMSu AS 305 in trusted DN, such as DN 307, is selected to receive content for streaming service. Link 323 may relate to M3u, which may be an internal API used to exchange information for content hosting on 5GMSu AS 305 within a trusted DN such as DN 307. Link 324 may relate to M4u, which may be a Media Uplink Streaming API exposed by 5GMSu AS 323 to Media Streamer 310 to stream media content. Link 325 may relate to M5u, which may be a Media Session Handling API exposed by 5GMSu AF 305 to Media Session Handler for media session handling, control and assistance that also include appropriate security mechanisms e.g. authorization and authentication. Link 326 may relate to M6u, which may be a UE 303 Media Session Handling API exposed by Media Session Handler 309 to 5GMSu Aware Application 302 to make use of 5GMSu functions. Link 327 may relate to M7u, which may be a UE Media Streamer API exposed by Media Streamer 310 to 5GMSu Aware Application 302 and Media Session Handler 309 to make use of Media Streamer 310. Link 328 may relate to M8u, which may be an Application API which is used for information exchange between 5GMSu Aware Application 302 and 5GMSu Application Provider 301, for example to provide service access information to the 5GMSu Aware Application 302. The UE 303 may also be implemented in a self-contained manner such that interfaces M6u 326 and M7u 327 are not exposed.

Figure 4:
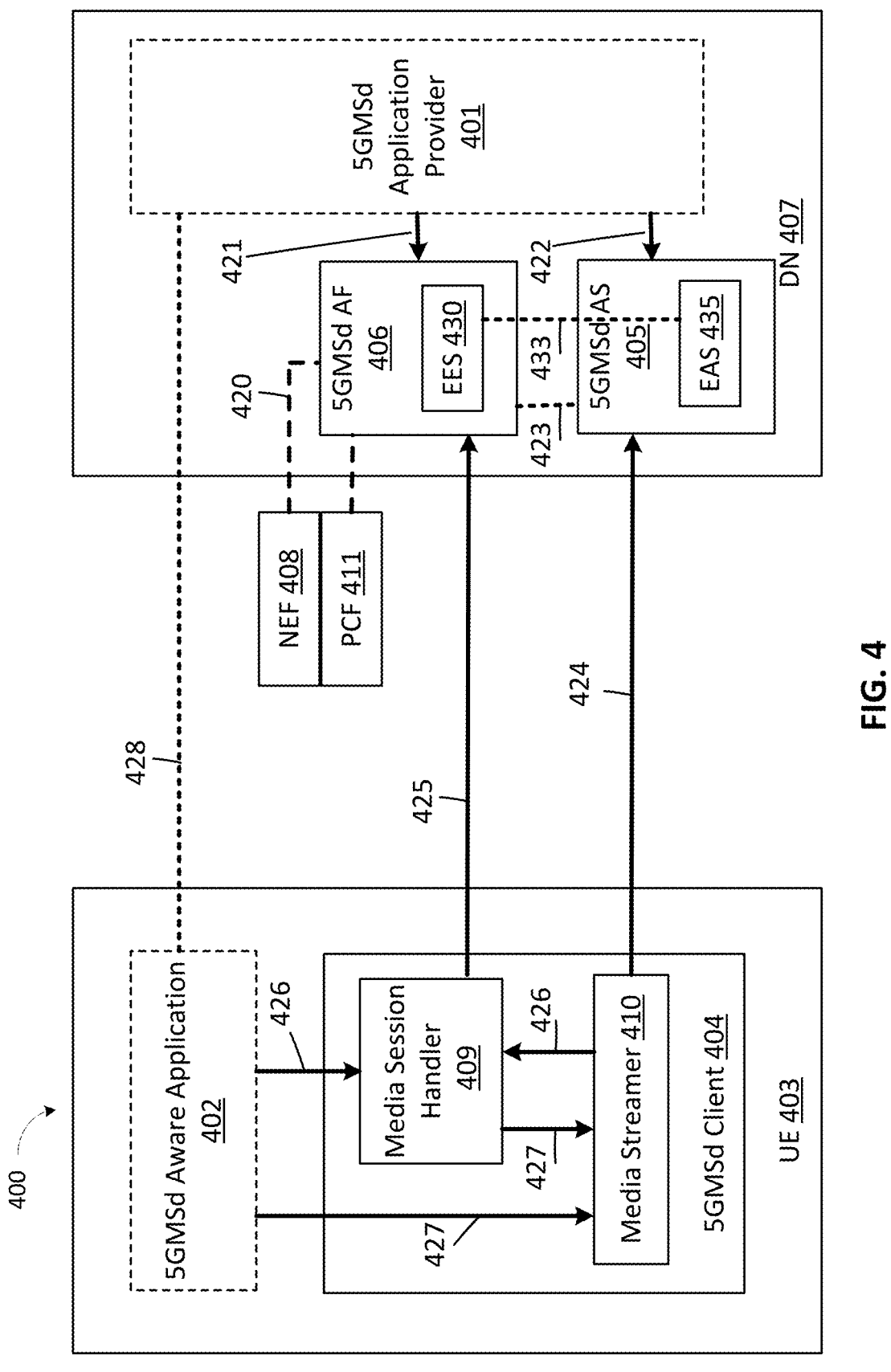
FIG. 4 is a block diagram of a 5G media streaming architecture with edge computing extension for media downlink streaming, according to embodiments.

FIG. 4 is a block diagram of a 5G media streaming architecture 400 with edge computing extension for media downlink streaming, according to embodiments. A 5GMSd Application Provider 401 may use 5GMSd for downlink streaming services. 5GMSd Application provider 401 may provide a 5GMSd Aware Application 402 on the UE 403 to make use of 5GMSd Client 404 and network functions using interfaces and APIs defined in 5GMSd. 5GMSd AS may be an AS dedicated to 5G Media Downlink Streaming. 5GMSd Client 404 may be a UE 403 internal function dedicated to 5G Media Downlink Streaming.

5GMSd AF 406 and 5GMSd AS 405 may be DN 407 functions. Functions in trusted DNs may be trusted by the operator's network. Therefore, AFs in trusted DNs may directly communicate with all 5G Core functions. Functions in external DNs may only communicate with 5G Core functions via the NEF 408 using link 420.

The media architecture 400 may connect UE 403 internal functions and related network functions for 5G Media Downlink Streaming. Accordingly, media architecture 400 may include a number of functions. For example, 5GMSd Client 404 on UE 403 may be a receiver of 5GMSd service that may be accessed through interfaces/APIs. 5GMSd Client 404 may include two sub-functions, media session handler 409 and media Player 410. Media session handler 409 may communicate with the 5GMSd AF 406 in order to establish, control and support the delivery of a media session. The Media Session Handler 409 may expose APIs that can be used by the 5GMSd Aware Application 402. Media Player 410 may communicate with 5GMSd AS 405 in order to stream the media content and provide a service to the 5GMSd Aware Application 402 for media playback, and the Media Session Handler 409 for media session control. 5GMSd Aware Application 402 may control 5GMSd Client 404 by implementing external application or content service provider specific logic and enabling the establishment of a media session. 5GMSd AS 405 may host 5G media functions. 5GMSd Application Provide 401 may be an external application or content specific media functionality, e.g., media creation, encoding, and formatting that uses 5GMSd to stream media to 5GMSd Aware Application 402. 5GMSd AF 406 may provide various control functions to the Media Session Handler 409 on the UE 403 and/or to 5GMSd Application Provider 401. 5GMSd AF 406 may relay or initiate a request for different PCF 411 treatment or interact with other network functions.

Media architecture 400 may include a number of different interfaces. For example, link 421 may relate to M1d, which may be a 5GMSd Provisioning API exposed by 5GMSd AF 406 to provision usage of media architecture 400 and to obtain feedback. Link 422 may relate to M2d, which may be a 5GMSd Ingest API exposed by 5GMSd AS 405 and used when 5GMSd AS 405 in trusted DN, such as DN 407, is selected to receive content for streaming service. Link 423 may relate to M3d, which may be an internal API used to exchange information for content hosting on 5GMSd AS 405 within a trusted DN such as DN 407. Link 424 may relate to M4d, which may be a Media Downlink Streaming API exposed by 5GMSd AS 423 to Media Player 410 to stream media content. Link 425 may relate to M5d, which may be a Media Session Handling API exposed by 5GMSd AF 405 to Media Session Handler for media session handling, control and assistance that also include appropriate security mechanisms e.g. authorization and authentication. Link 426 may relate to M6d, which may be a UE 403 Media Session Handling API exposed by Media Session Handler 409 to 5GMSd Aware Application 402 to make use of 5GMSd functions. Link 427 may relate to M7d, which may be a UE Media Player API exposed by Media Player 410 to 5GMSd Aware Application 402 and Media Session Handler 409 to make use of Media Player 410. Link 428 may relate to M8d, which may be an Application API which is used for information exchange between 5GMSd Aware Application 402 and 5GMSd Application Provider 401, for example to provide service access information to the 5GMSd Aware Application 402.

As depicted in FIGS. 3 and 4, the 5G media streaming architecture 300 (or 400) with edge computing extension includes an edge enabler server (EES) 330 (or 430) in the 5GMSu AF 306 (or 5GMSd AF 406) and an edge application server (EAS) 335 (or 435) in the 5GMSu AF 305 (or 5GMSd AF 405), respectively. In some implementations, the EES 330 (or 430) is communicatively connected to the EAS 335 (or 435) via the link 333 (or 433). For example, the link 333 (or 433) may be an M1 interface.

The EES 330 (or 430) provides supporting functions needed for EASs and edge enabler client (EEC). In some implementations, the functionalities of the EES 330 (or 430) includes, but are not limited to: a) provisioning of configuration information to EEC, enabling exchange of application data traffic with the EAS 335 (or 435); b) providing API invoker and API exposing functions; c) interacting with 3GPP Core Network for accessing the capabilities of network functions either directly (e.g. via PCF) or indirectly (i.e. SCEF/NEF/SCEF+NEF); d) exposing events related to ACT; e) EEC context transfer between EESs; e) supporting external exposure of 3GPP network and service capabilities to the EAS(s) over EDGE-3; f) registration functions (i.e., registration, update, and de-registration) for the EEC(s) and the EAS(s); and g) triggering the EAS instantiation on demand.

The EAS 335 (or 435) is the application server resident in the Edge Data Network (EDN), performing the server functions. The application client (AC) in the UE 303 (or 403) connects to the EAS 335 (435) or in order to avail the services of the application with the benefits of Edge Computing. In some implementations, the server functions of an application are available only as an EAS. In some other implementations, certain server functions are available both at the edge and in the cloud, as an EAS and an Application Server resident in the cloud respectively. The server functions offered by the EAS 335 (or 435) and its cloud Application Server counterpart may be the same or may differ; if they differ, the Application Data Traffic exchanged with the AC may also be different. In some implementations, the EAS 335 (or 435) consumes the 3GPP Core Network capabilities in the following ways: a) invoking 3GPP Core Network capabilities via the edge enabler layer through the EES; b) invoking 3GPP Core Network function (e.g. PCF) APIs directly, if it is an entity trusted by the 3GPP Core Network; and c) invoking the 3GPP Core Network capabilities through the capability exposure functions i.e. SCEF/NEF/SCEF+NEF.

Provisioning is a step that allows a 5GMS Application Provider 301 (or 401) to configure information about its edge processing requirements for media streaming sessions.

In some implementations, the following information is configurable by the 5GMS Application Provider over reference point M1:

Condition for activation of edge processing, e.g. the traffic descriptors, application identifier, geographic location of the UE 303 (or 403), etc.

Selection of client-driven or Application Provider-driven management.

EAS profile information for each EAS 335 (or 435) that will serve the application, such as the service KPIs, geographical location, and service continuity support.

Application context relocation tolerance and requirements.

For client-driven edge processing, an edge-enabled 5GMS AF shall support sharing any required configuration information about edge processing with the Media Session Handler through Service Access Information at reference point M5. This enables the EEC embedded in the Media Session Handler to request edge processing for a streaming session from the EES embedded in the 5GMS AF, realising reference point EDGE-1. Service provisioning procedures supply the information required by the UE to access the edge services. The procedure takes UE's location, service requirements, service preferences and connectivity information into account to provide the required configuration.

In some implementations, the Application Provider 301 (or 401) can provision a new EAS 335 (or 435) via the M1 interface. Using this interface, the Application Provider 301 (or 401) can create, update, retrieve the edge resource configuration using the operations supported by the edge resources API as depicted in FIG. 5 and the dataset used for supporting the operations is defined in FIG. 6.

The Application Provider 301 (or 401) instantiates a process for activating the EAS 335 (or 435) based on the received edge configuration resource request. The 5GMS Application Provider uses the HTTP POST method for this purpose and the request message body shall include an EdgeResourcesConfiguration dataset. In some implementations, a different process may be initiated depending on the edge management mode, which can be network-side or client-side. A qualification of the service provided by the EAS 335 (or 435) is based, at least in part, on the eligibility criteria property. The process of discovering or instantiating one or more EAs is through the EDGE APIs and the process of updating the edge resource configuration is achieved by including the activated edge server identifiers.

The 5GMS AF 306 (or 406), which is edge-enabled and supports EES functionality, supports the following functionalities:

Check for any eligible new stream if all required conditions in eligibilityCriteria in the EdgeResourcesConfiguration dataset are met;

EDGE-1 API for supporting registration and provisioning of EEC functions, and discovery by them of EAS instances;

EDGE-3 API towards the EAS function of 5GMS AS instances;

EDGE-6 API for registering with an ECS function;

EDGE-9 API for media session relocation; and

Compute resource allocation using the MnS-C interface.

The media session handler (MSH) 309 (or 409), which is edge-enabled and supports EEC functionality, supports the following functionalities:

Check for any eligible new stream if all required conditions in the eligibilityCriteria in the EdgeResourcesConfiguration dataset are met;

Invoke the EES function using the EDGE-1 API;

Invoke the ECS function using the EDGE-4 API; and
Expose EDGE-5 API to the Application Client.

In some implementations, if the edgeManagmentMode property in the EdgeResourcesConfiguration request is set to EM_NETWORK_DRIVEN for network-driven edge resource management, the 5GMS AF 306 (or 406) is responsible for requesting and managing the required edge resources and handling EAS relocation for the streaming session. For example, if the 5GMS AF 306 (or 406) does not meet the aforementioned edged-enabled requirements, it may provide a response code for the unsuccessful request to the party that submits the request.

Otherwise, the 5GMS AF 306 (or 406) may generate a resource identifier (e.g., edgeResourcesConfigurationId) representing the new Edge Resources Configuration and provide it in a successful response to the requesting party. For each new eligible media stream, the 5GMS AF 306 (or 406) checks if all required conditions in eligibilityCriteria property are met. If any condition of the easRequirements property is not met with the current 5GMS AS/EAS by using EDGE-3 APIs, the 5GMS AF 306 (or 406) searches for or instantiate one or more 5GS AS/EAS that satisfy both the easRequirements and easRelocationRequirements properties of the requested EdgeResourcesConfiguration dataset. If a new EAS is activated, then the 5GMS AF 306 (or 406) may update the easId of EdgeResourcesConfiguration with the EAS id of the new EAS when the easIdFlag is 'True'.

If the edgeManagmentMode property in the EdgeResourcesConfiguration request is set to EM_APP_DRIVEN but the MSH that does not meet the aforementioned requirements, the 5GMS AF 306 (or 406) then provides a response code for the unsuccessful request. to the party that submits the request.

Otherwise, the 5GMS AF 306 (or 406) generates a new resource identifier representing the new Edge Resources Configuration and provides it in a successful response to the requesting party. In some implementations, the 5GMS AF 306 (or 406) only requests the edge resources based on a request from the EEC instantiated in the MSH 309 (or 409). For each new eligible media stream, assuming that all required conditions in eligibilityCriteria are met, but if any condition of the easRequirements property is not met with the current 5GMS AS/EAS using EDGE-1 APIs, the MSH 309 (or 409) then requests the discovery of eligible EAS through its EEC's EDGE-1 API. In some embodiments, the MSH 309 (or 409) may provide the selected easId to the Application Provider through M6/EDGE-5 API.

In sum, a method for activating edge servers based on the edge configuration request from another party is proposed using the 5G edge application APIs, which has two possible cases depending on the party that submits the request, which can be the 5GMS Application Provider 301 (or 401) or the UE 303 (or 403).

In the network-driven case, i.e., the request comes from the 5GMS Application Provider 301 (or 401), the 5GMS AF 306 (or 406) checks if a new media streaming session satisfies the eligibility criteria and then uses the edge application APIs to communicate with the EAS 335 (or 435). The 5GMS AF 306 (or 406) retrieves the current active EAS profile and then discovers or instantiates a new edge server depending on whether the profiles satisfy the requested profile in the edge configuration request or not.

In the application-driven case, the MSH 309 (or 409) on the client side first checks if a new media streaming session satisfies the eligibility criteria and then uses the edge application APIs over the Edge-1 interface. The 5GMS AF 306 (or 406) retrieves the current active EAS profile and then discovers or instantiates a new edge server depending on whether the profiles satisfy the requested profile in the edge configuration request or not.

FIG. 7 is a flowchart of a method 800 for provisioning edge resources performed by a computing device acting as the 5GMS AF 306 (or 406) in a 5G media streaming (5GMS) architecture, according to embodiments.

In operation 702, the computing device receives a new edge resources configuration request from a first device in connection with a 5G media streaming session. As noted above, the first device may be associated with the 5GMS Application Provider 301 (or 401) or the UE 303 (or 403).

In operation 704, the computing device determines an edge management mode of the new edge resources configuration request. In operation 706, the computing device allocates edge resources for the 5G media streaming session based on the edge management mode. In operation 708, the computing device returns a response to the first device, the response including information of the edge resources allocated for the new edge resources configuration request.

In some implementations, the edge management mode of the edge configuration request is a network-driven mode. In this case, the computing device allocates the edge resources for the streaming session based on the edge management mode by (i) generating a resource identifier for the new edge resources configuration request; (ii) identifying existing edge resources satisfying one or more predefined conditions in the new edge resources configuration request as the edge resources allocated for the new edge resources configuration request; and (iii) including the resource identifier and information of the identified existing edge resources in the response to the first device.

In some implementations, the computing device determines that at least one of the predefined conditions the new edge resources configuration request is not satisfied by the existing edge resources. In this case, the computing device then instantiates new edge resources satisfying the predefined conditions for the new edge resources configuration request and includes information of the newly instantiated edge resources in the response to the first device.

In some implementations, the edge management mode of the edge configuration request is an application-driven mode. In this case, the computing device allocates the edge resources for the streaming session based on the edge management mode by: (i) generating a resource identifier for the new edge resources configuration request; upon receipt of a second request from a client device: (ii) identifying existing edge resources satisfying one or more predefined conditions in the new edge resources configuration request as the edge resources allocated for the new edge resources configuration request; and (iii) including the resource identifier and information of the identified existing edge resources in the response to the first device.

In some implementations, the computing device determines that at least one of the predefined conditions the new edge resources configuration request is not satisfied by the existing edge resources. In this case, the computing device then instantiates new edge resources satisfying the predefined conditions for the new edge resources configuration request and including information of the newly instantiated edge resources in the response to the first device.

In some implementations, the identified existing edge resources in the response to the first device is based, at least in part, upon resource identifiers in the second request from the client device.

In some implementations, the new edge resources configuration request includes an activation trigger element for limiting the edge resources allocated for the new edge resources configuration request to the media session. For example, the edge resources for the new edge resources configuration request to the media session may be allocated for a predefined geographical region and/or during a predefined time period.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present invention. First ranking criteria and second ranking criteria are both ranking criteria, but they are not the same ranking criteria.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A computer-implemented method for provisioning edge resources performed by a computing device in a 5G media streaming (5GMS) architecture, the method comprising:

receiving a new edge resources configuration request from a first device in connection with a 5G media streaming session;

determining that an edge management mode of the new edge resources configuration request is one of a network-driven node and an application-drive node;

generating a resource identifier for the new edge resources configuration request;

identifying existing edge resources satisfying one or more predefined conditions in the new edge resources configuration request as the edge resources allocated for the new edge resources configuration request;

in an accordance with a determination that at least one of the predefined conditions in the new edge resources configuration request is not satisfied by the existing edge resources:

instantiating new edge resources satisfying the predefined conditions for the new edge resources configuration request; and including the resource identifier and information of the newly instantiated edge resources in a response to the first device;

returning the response to the first device.

2. The method according to claim 1, wherein the edge management mode of the edge configuration request is the application-driven mode and the existing edge resources is identified upon receipt of a second request from a client device.

3. The method according to claim 2, wherein the identified existing edge resources in the response to the first device is based, at least in part, upon resource identifiers in the second request from the client device.

4. The method according to claim 1, wherein the first device is associated with an application provider or a media session handler associated with a user equipment.

5. The method according to claim 1, wherein the new edge resources configuration request includes an activation trigger element for limiting the edge resources allocated for the new edge resources configuration request to the media session.

6. A computing device, comprising:

one or more processors;

memory; and one or more executable instructions, wherein the executable instructions are stored in the memory and executed by the one or more processors to cause the computing device to perform a computer-implemented method for provisioning edge resources in a 5G media streaming (5GMS) architecture, the method including:

receiving a new edge resources configuration request from a first device in connection with a 5G media streaming session;

determining that an edge management mode of the new edge resources configuration request is one of a network-driven node and an application-drive node;

generating a resource identifier for the new edge resources configuration request;

identifying existing edge resources satisfying one or more predefined conditions in the new edge resources configuration request as the edge resources allocated for the new edge resources configuration request;

in an accordance with a determination that at least one of the predefined conditions in the new edge resources configuration request is not satisfied by the existing edge resources:

instantiating new edge resources satisfying the predefined conditions for the new edge resources configuration request; and including the resource identifier and information of the newly instantiated edge resources in a response to the first device;

returning the response to the first device.

7. The computing device according to claim 6, wherein the edge management mode of the edge configuration request is the application-driven mode and the existing edge resources is identified upon receipt of a second request from a client device.

8. The computing device according to claim 7, wherein the identified existing edge resources in the response to the first device is based, at least in part, upon resource identifiers in the second request from the client device.

9. The computing device according to claim 6, wherein the first device is associated with an application provider or a media session handler associated with a user equipment.

10. The computing device according to claim 6, wherein the new edge resources configuration request includes an activation trigger element for limiting the edge resources allocated for the new edge resources configuration request to the media session.

11. A non-transitory computer-readable storage medium storing one or more executable instructions that, when executed by one or more processors of a computing device, cause the computing device to perform a computer-implemented method for provisioning edge resources in a 5G media streaming (5GMS) architecture, the method including:

receiving a new edge resources configuration request from a first device in connection with a 5G media streaming session;

determining that an edge management mode of the new edge resources configuration request is one of a network-driven node and an application-drive node;

generating a resource identifier for the new edge resources configuration request;

identifying existing edge resources satisfying one or more predefined conditions in the new edge resources configuration request as the edge resources allocated for the new edge resources configuration request;

in an accordance with a determination that at least one of the predefined conditions in the new edge resources configuration request is not satisfied by the existing edge resources:

instantiating new edge resources satisfying the predefined conditions for the new edge resources configuration request; and including the resource identifier and information of the newly instantiated edge resources in a response to the first device;

returning the response to the first device.

12. The non-transitory computer-readable storage medium according to claim 11, wherein the edge management mode of the edge configuration request is the application-driven mode and the existing edge resources is identified upon receipt of a second request from a client device.

13. The non-transitory computer-readable storage medium according to claim 12, wherein the identified existing edge resources in the response to the first device is based, at least in part, upon resource identifiers in the second request from the client device.

14. The non-transitory computer-readable storage medium according to claim 11, wherein the new edge resources configuration request includes an activation trigger element for limiting the edge resources allocated for the new edge resources configuration request to the media session.

15. The non-transitory computer-readable storage medium according to claim 11, wherein the first device is associated with an application provider or a media session handler associated with a user equipment.

* * * * *